(12) United States Patent
Lyons et al.

(10) Patent No.: US 6,473,007 B2
(45) Date of Patent: Oct. 29, 2002

(54) SINGLE CLOCK REFERENCE FOR COMPRESSED DOMAIN PROCESSING SYSTEMS WITH INTERSPERSED TRANSPORT PACKETS

(75) Inventors: Paul W. Lyons, New Egypt, NJ (US); Alfonse A. Acampora, Staten Island, NY (US); John P. Beltz, Willingboro, NJ (US)

(73) Assignee: Leitch Incorporated, Chesapeake, VA (US)

( * ) Notice: Subject to any disclaimer, the term of this patent is extended or adjusted under 35 U.S.C. 154(b) by 0 days.

(21) Appl. No.: 09/912,432

(22) Filed: Jul. 25, 2001

(65) Prior Publication Data

US 2002/0070884 A1 Jun. 13, 2002

Related U.S. Application Data

(63) Continuation of application No. 09/506,612, filed on Feb. 18, 2000, now Pat. No. 6,356,212.
(60) Provisional application No. 60/220,669, filed on Jul. 25, 2000.

(51) Int. Cl.$^7$ ................................................. H03M 7/00
(52) U.S. Cl. ............................. 341/60; 360/51; 360/48; 360/18; 370/468
(58) Field of Search ....................... 341/60, 51; 360/48, 360/51; 370/408

(56) References Cited

U.S. PATENT DOCUMENTS

| | | | | |
|---|---|---|---|---|
| 4,736,371 A | * | 4/1988 | Tejima et al. ................ | 370/236 |
| 5,619,337 A | * | 4/1997 | Naimpally .................... | 360/18 |
| 5,990,967 A | * | 11/1999 | Kawakami et al. .......... | 348/500 |
| 6,097,739 A | | 8/2000 | Yamashita ................... | 370/468 |
| 6,157,674 A | * | 12/2000 | Oda et al. .................... | 370/503 |
| 6,233,256 B1 | | 5/2001 | Dieterich et al. ........... | 370/506 |
| 6,246,701 B1 | | 6/2001 | Slattery ....................... | 370/503 |
| 6,351,474 B1 | * | 2/2002 | Robinett et al. ............ | 370/468 |

* cited by examiner

*Primary Examiner*—Peguy JeanPierre
(74) *Attorney, Agent, or Firm*—Dechert; Daniel S. Goldberg

(57) ABSTRACT

A system and method for generating a transport packet stream having an output formatted as an ASI group having a plurality of short and long ASI packets in a fixed sequence. The short and long ASI packet each have an associated transport packet and a fixed number of special idle characters and the transport packets are dispersed among the special idle characters.

18 Claims, 2 Drawing Sheets

EXEMPLARY FORMAT OF THE ASI PACKET

EXEMPLARY FORMAT OF THE ASI GROUP

1 TICK = 1 PROGRAM CLOCK CYCLE @ 27 MHz

INTERSPERSED TRANSPORT STREAM BYTES

SINGLE CLOCK REFERENCE FOR COMPRESSED DOMAIN PROCESSING SYSTEMS WITH INTERSPERSED TRANSPORT PACKETS

This application is a continuation of U.S. application Ser. No. 09/506,612, filed Feb. 18, 2000, now U.S. Pat. No. 6,356,212.

This application claims the benefit of Provisional Patent Application Serial No. 60/220,669, filed Jul. 25, 2000.

GOVERNMENT INTERESTS

This invention was made with U.S. government support and funded by NIST under contract number 70NANB5H1174. The U.S. government has certain rights in this invention.

The present invention relates to the generation of digital video signals. In particular, the invention is directed to improvements to Asynchronous Serial Interface (ASI) bitstream formation in order to simplify the design requirements of a downstream receiver, especially by lowering the required processing speed.

The Moving Picture Experts Group (MPEG) created the ISO/IEC international Standards 11172 and 13818 (generally referred to as MPEG-1 and MPEG-2 format respectively) to establish a standard for coding/decoding strategies. Although these MPEG standards specify a general coding methodology and syntax for generating an MPEG compliant bitstream, many variations and preconditions are permitted.

The locked clock approach facilitates the formation of various output format standards. In the particular case of ASI output, a logic circuit uses the 27 Mhz to generate the data clock for inputting data to an ASI formatting chip set. The DVB-ASI format specifies a data rate of 27 Mbytes/sec, and allows for insertion of specially defined idle characters both between transport packets and within transport packets.

It is possible to map the ATSC byte rate to this interface rate by only inserting the special idle characters between packets. Prior to the initiation of the packet data output by the Transport Stream Encoder (TSE) Software, special idle characters are continuously output. After the Transport packet data output is initiated, the Output Interface format is a flow of 188 packet bytes followed by a string of the special idle characters before the next Transport packet bytes are issued. This forms an ASI Packet. The invention encompasses alternate systems and methods for implementing a locked clock approach.

SUMMARY OF THE INVENTION

The invention relates to a system and method for generating a transport packet stream. The invention encompasses outputting an ASI group having a plurality of short and long ASI packets in a fixed sequence, wherein each short and long ASI packet each has an associated transport packet and a fixed number of special idle characters and wherein the transport packets are dispersed among the special idle characters.

In one embodiment, the transport packets have a plurality of adjacent bytes interleaved among special idle characters. In another embodiment, the transport packets have a plurality of separate bytes that are interleaved among the special idle characters. In yet another embodiment, 10 special idle characters are interleaved between successive transport packets bytes.

The invention encompasses systems and methods for generating a transport packet stream wherein the short ASI packet has 2093 bytes formatted with a 188 byte transport packet wherein 10 special idle characters are interleaved between successive transport packets bytes followed by 25 special idle characters.

The invention encompasses systems and methods for generating a transport packet stream wherein the long ASI packet has 2094 bytes formatted with a 188 byte transport packet wherein 10 special idle characters are interleaved between successive transport packets bytes followed by 26 special idle characters.

The invention encompasses outputting an ASI group having a plurality of short and long ASI packets in a fixed sequence, wherein the short ASI packets each have 2093 bytes including a 188 byte transport packet and 1905 special idle characters and wherein the long ASI packets each have 2094 bytes including a 188 byte transport packet and 1906 special idle characters and wherein the transport packets are dispersed among the special idle characters. Again, the transport packet bytes can be a unified group interleaved among special idle characters or the transport packets bytes can be separately interleaved among the special idle characters.

DETAILED DESCRIPTION OF THE INVENTION

Figure 1:
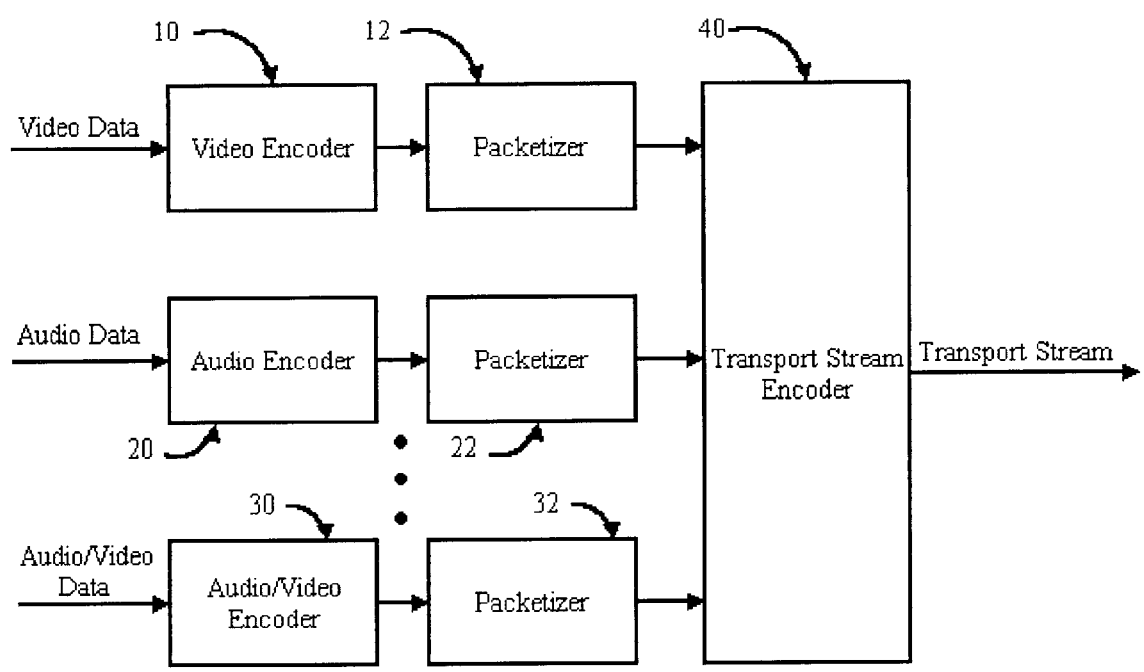
FIG. 1 shows a simplified block diagram of a transport stream encoder system in accordance with the invention.

FIG. 1 shows a simplified block diagram of a transport stream encoder system in accordance with the invention. The system preferably includes at least one video encoder 10 for receiving and encoding video data into an elementary video bitstream. The system also preferably includes at least one audio encoder 20 for receiving and encoding audio data into an elementary audio bitstream. In turn, these bitstreams are sent to packetizers 12 and 22 where the elementary bitstreams are converted into packets. It is understood that information for using the packets independently of the transport stream may be added when the packets are formed (e.g., non-audio/video data).

The packets are received and multiplexed by the transport stream encoder 40 to produce a transport stream. It is understood that a variety of commercially available chipsets are suitable for implementing a transport stream encoder in accordance with the invention. In general, packets are constructed from elementary streams. One or more program groups are formed with associated "Packet Identifiers" (PIDs). Each program group may have associated video data and/or audio data. Data associated with a single PID generally shares a common time base. It is understood that the transport stream may contain one or more programs with one or more independent time bases.

It is also understood that the transport stream may be transmitted over a transmission channel (not shown). Ultimately, the transport stream will be demultiplexed and decoded by a transport stream demultiplexor (not shown). To this end, timing information is extracted by the transport stream demultiplexor for synchronizing the video and audio decoders. Such synchronization is accomplished through the use of the "Program Clock Reference" (PCR) in the transport stream.

The invention encompasses a locked clock approach to generate output formats conforming to various standards. In the particular case of ASI output, a logic circuit uses the 27 Mhz to generate the data clock for inputting data to an ASI formatting chip set. The DVB-ASI format specifies a data rate of 27 Mbytes/sec, and allows for insertion of specially defined idle characters both between transport packets and within transport packets.

In order to map the ATSC byte rate to this interface rate, it is possible to only insert the special idle characters between packets. Prior to the initiation of the packet data output by the Transport Stream Encoder (TSE) Software, special idle characters are continuously output. After the Transport packet data output is initiated, the Output Interface format is a flow of 188 packet bytes followed by a string of the special idle characters before the next Transport packet bytes are issued. This forms an ASI Packet.

Figure 2A:
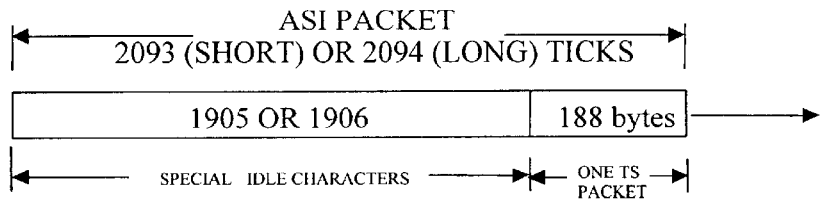
FIG. 2A shows the basic format of an ASI packet.

FIG. 2a shows the format of an ASI packet in having special idle characters inserted only between transport packets. In order to insure that Program Clock Reference (PCR) packets issued by the TSE are properly placed, two types of ASI packets, short and long, are created. In the short ASI packet, 1,905 special idle character bytes are inserted after the 188 byte Transport Packet. In the long ASI packet, 1,906 special idle character bytes are inserted after the 188 Transport Packet byes. Therefore, the short ASI packet has a total of 2,093 bytes, and the long ASI packet has a total of 2,094 bytes.

Figure 2B:
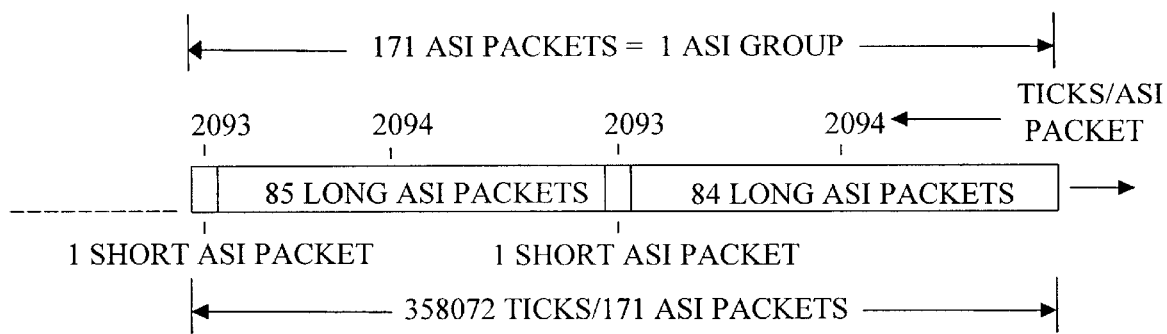
FIG. 2B shows the basic format of an ASI Group.

Both the Transport packet bytes and special idle character bytes are serialized to the 270 Mbps DVB-ASI output interface rate. This dictates that each byte of an ASI packet must be output at every cycle (tick) of the 27 MHz clock. To absolutely minimize the jitter between successive PCR transport packets in the stream, an ASI Group, formed from a well defined assortment of short and long ASI packets is identified. The ASI Group is defined as 1 short ASI packet, followed by 85 long ASI packets, followed by 1 short ASI Packet, and finally followed by 84 long ASI Packets, as shown in FIG. 2B.

The generation and output of an ASI group can also be described in terms of ticks of the 27 MHz clock. During the time interval of the ASI Group of 171 assorted short and long ASI packets there are exactly 358072 Program Clock ticks. Output byte timing is determined by allocating a distinct pattern of 27 Mhz (PCR) clock cycles to each ASI group. Exactly 2093 PCR ticks are allocated to the first packet. This is followed by 2094 PCR ticks for each of the next 85 packets, followed by 2093 PCR ticks for the next packet, followed by 2094 PCR ticks for each of 84 packets to generate a smoothed flow of output bytes as shown in FIG. 1B.

Packet spacing is relatively uniform with only one clock cycle of 27 Mhz difference between a few of the packets. This approach locks the 27 Mhz PCR clock to the output byte clock. Bytes are output at exactly the ATSC output rate relative to the PCR timing reference.

Extension of the ASI Formation Technique

Figure 3:
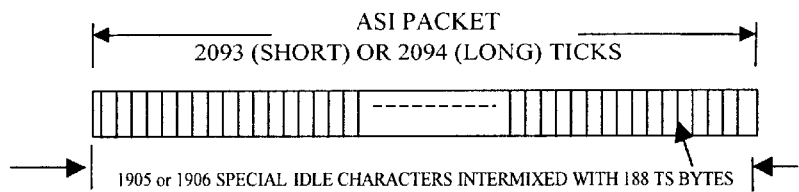
FIG. 3 shows interspersed transport stream bytes in accordance with the invention.

The 188-byte Transport packet, shown grouped at one end of the ASI Packet of FIG. 2A, can be dispersed within the ASI Packet (i.e., placed anywhere within the ASI Packet). It is also understood that the Transport packet need not be kept as a unified group (i.e., having all bytes adjacent), as described in the SAR 13662 filing. In fact, the individual bytes of the 188 byte Transport packet can be dispersed among the special idle character bytes, as shown in FIG. 3.

The benefit of dispersing the Transport Stream Packet bytes is that this lowers the effective peak processing rate of the Transport Stream bytes at a receiver. In FIG. 1A, the Transport Stream information must be processed at a continuum of 270 Mbits/s because the Transport Stream bytes are consecutive. By spreading the Transport Stream bytes among the special idle character, the sustained receiver processing rate is lowered. There are countably many ways to interleave the Transport Stream bytes among the idle characters. One convenient approach is to insert 10 idle characters between each Transport Stream byte, and eventually filling out the ASI packet with either 25 or 26 idle characters depending upon whether it is a short (2095 byte) or long (2096 byte) ASI packet. This approach tends to minimize the byte processing rate at the receiver. The formation of the ASI group, shown in FIG. 1B is unaffected.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A method for generating a transport packet stream comprising outputting an ASI group having a plurality of short and long ASI packets in a fixed sequence, wherein the short and long ASI packet each have an associated transport packet and a fixed number of special idle characters and wherein the transport packets are dispersed among the special idle characters.

2. The method of claim 1 wherein the transport packets have a plurality of adjacent bytes interleaved among special idle characters.

3. The method of claim 1 wherein the transport packets have a plurality of separate bytes that are interleaved among the special idle characters.

4. The method of claim 3 wherein 10 special idle characters are interleaved between successive transport packets bytes.

5. The method of claim 3 wherein the short ASI packet has 2093 bytes formatted with a 188 byte transport packet wherein 10 special idle characters are interleaved between successive transport packets bytes followed by 25 special idle characters.

6. The method of claim 3 wherein the long ASI packet has 2094 bytes formatted with a 188 byte transport packet wherein 10 special idle characters are interleaved between successive transport packets bytes followed by 26 special idle characters.

7. A method for generating a transport packet stream comprising outputting an ASI group having a plurality of short and long ASI packets in a fixed sequence, wherein the short ASI packets each have 2093 bytes including a 188 byte transport packet and 1905 special idle characters and wherein the long ASI packets each have 2094 bytes including a 188 byte transport packet and 1906 special idle characters and wherein the transport packets are dispersed among the special idle characters.

8. The method of claim 7 wherein the transport packet bytes are a unified group interleaved among special idle characters.

9. The method of claim 7 wherein the transport packets bytes are separately interleaved among the special idle characters.

10. A system for generating a transport packet stream comprising transport stream encoder operable to output an ASI group having a plurality of short and long ASI packets in a fixed sequence, wherein the short and long ASI packet each have an associated transport packet and a fixed number of special idle characters and wherein the transport packets are dispersed among the special idle characters.

11. The system of claim 10 wherein the transport packets have a plurality of adjacent bytes interleaved among special idle characters.

12. The system of claim 10 wherein the transport packets have a plurality of separate bytes that are interleaved among the special idle characters.

13. The system of claim 12 wherein 10 special idle characters are interleaved between successive transport packets bytes.

14. The system of claim 12 wherein the short ASI packet has 2093 bytes formatted with a 188 byte transport packet wherein 10 special idle characters are interleaved between successive transport packets bytes followed by 25 special idle characters.

15. The system of claim 12 wherein the long ASI packet has 2094 bytes formatted with a 188 byte transport packet wherein 10 special idle characters are interleaved between successive transport packets bytes followed by 26 special idle characters.

16. A system for generating a transport packet stream comprising a transport stream encoder operable to output an ASI group having a plurality of short and long ASI packets in a fixed sequence, wherein the short ASI packets each have 2093 bytes including a 188 byte transport packet and 1905 special idle characters and wherein the long ASI packets each have 2094 bytes including a 188 byte transport packet and 1906 special idle characters and wherein the transport packets are dispersed among the special idle characters.

17. The system of claim 16 wherein the transport packet bytes are a unified group interleaved among special idle characters.

18. The system of claim 16 wherein the transport packets bytes are separately interleaved among the special idle characters.

* * * * *